May 15, 1951
C. H. PARTON
2,553,328
GUN HOLSTER ON BICYCLE TANKS
Filed Jan. 23, 1950
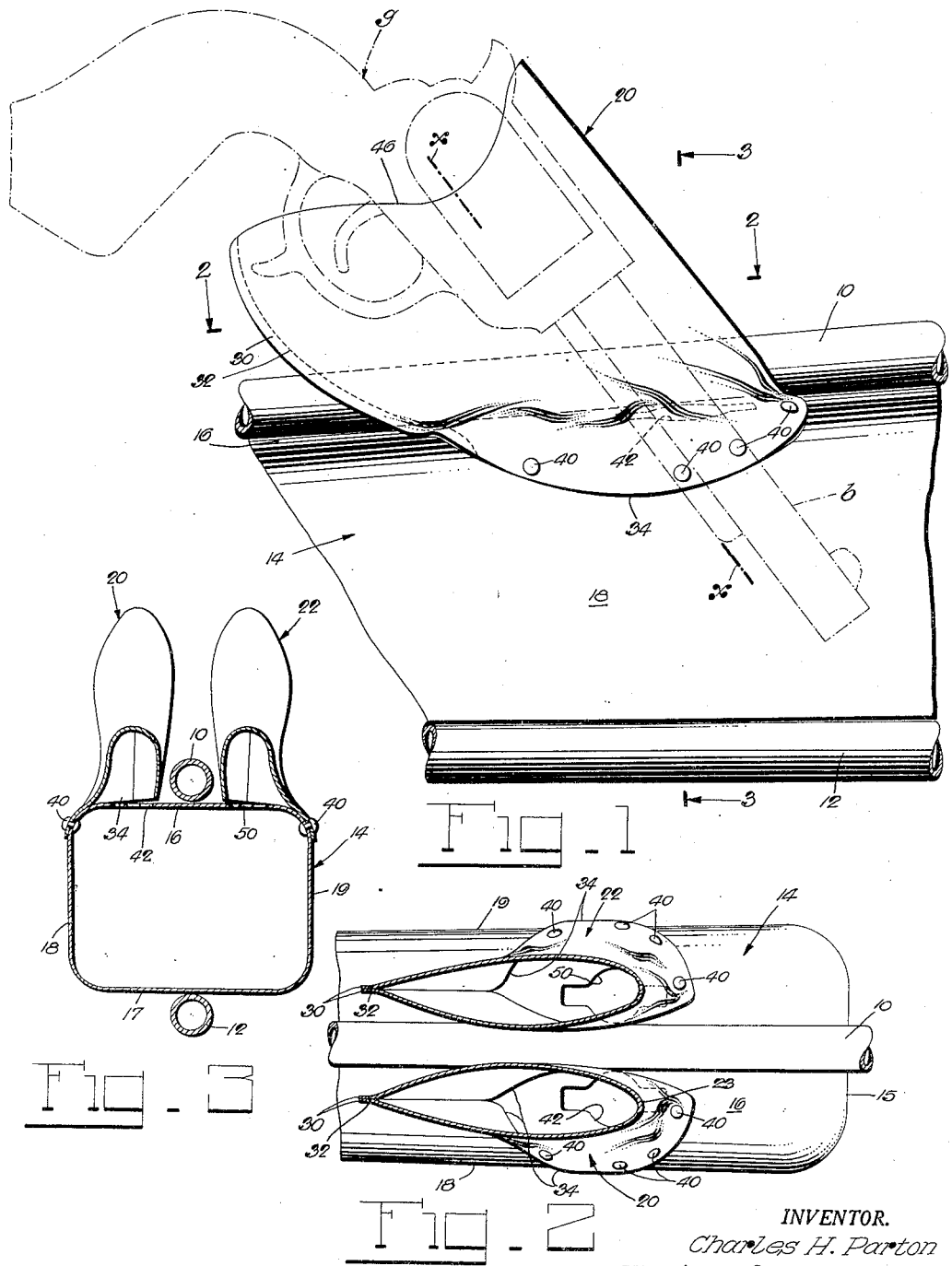
INVENTOR.
Charles H. Parton
BY Edwin Levisohn +
Harry Cohn
Attorneys.

Patented May 15, 1951

2,553,328

UNITED STATES PATENT OFFICE 2,553,328

GUN HOLSTER ON BICYCLE TANKS

Charles H. Parton, Ossining, N. Y., assignor to D. P. Harris Hdw. & Mfg. Co., Inc., New York, N. Y., a corporation Application January 23, 1950, Serial No. 140,020

10 Claims. (Cl. 224—2)

This invention relates to bicycles in general, and to play bikes for youngsters in particular.

It is an object of the present invention to provide a bicycle which in its construction embodies simulated characteristics of a horseback-riding gunman, thereby to enable youngsters to play outdoor games involving gun play on horseback, such as playing cowboy, for instance, more realistically on bicycles than was heretofore possible on foot.

It is another object of the present invention to provide a bicycle which embodies the simulated characteristics of a horseback-riding gunman in the form of a saddle holster or holsters for the reception of a toy gun or guns, so as to leave both hands of a youngster free safely to hold on to the handle bar of the bicycle when riding the same.

It is another object of the present invention realistically to simulate on a bicycle a saddle holster or holsters on a horse's back, by providing the bicycle with a tank and attaching thereto a gun holster or holsters in such fashion that the tank suggests to the rider of the bicycle and to other observant youngsters the back of a horse on which the holster or holsters appear in saddle holster fashion.

It is another object of the present invention to facilitate the construction of a simulated gun holster and its attachment to a tank on a bicycle, by providing a shortened gun holster from which the usually closed end is omitted, and by conveniently and expeditiously securing the shortened open end of the holster to an apertured portion of the bicycle tank through which the forward part of a toy gun in the holster may project into the interior of the tank.

The above and other objects, features and advantages of the present invention will be more fully understood from the following description considered in connection with the accompanying illustrative drawings.

In the drawings:

Fig. 1 is a side elevation of a part of a bicycle embodying the present invention; and Figs. 2 and 3 are reduced sections taken substantially on the lines 2—2 and 3—3, respectively, of Fig. 1.

Referring to the drawings, the reference numeral 10 denotes the customary top bar which in the conventional frame of a bicycle connects the seat post mast and the head (neither shown) in the latter of which the handle bar stem and the front wheel fork are customarily turnable in unison. The frame of the bicycle may also be provided with a double bar 12 which extends parallel to and beneath the top bar 10. Mounted in any suitable manner on the bicycle frame, and preferably interposed between the bars 10 and 12 thereof, is an elongated tank 14 of a shape commonly used on bicycles. The tank 14 is, in the present instance, substantially rectangular in cross section (Fig. 3), and comprises a top wall 16, a bottom wall 17, opposite side walls 18 and 19, and opposite end walls of which one is shown at 15 in Fig. 2. The top, bottom and side walls 16, 17, 18 and 19, respectively, of the tank may merge at their adjacent sides into each other in the smoothly rounded fashion shown best in Fig. 3. The bicycle herein described may to all intents and purposes be conventional in every respect.

In accordance with the present invention, there are provided on the tank 14 of the bicycle simulated gun holsters 20 and 22 which, in the present instance, are of identical construction and mounted in identical fashion on the tank 14. Hence, a detailed description of the construction of one of the gun holsters, namely, holster 20, and its mounting on the tank 14 suffices. The holster 20 may conveniently be made from a single blank of leather or any other suitable material, which is shaped so that it will assume the holster-like appearance shown in Fig. 1 when the blank is loosely bent back as at 23 (Fig. 2). The bent holster blank, which is of tubular form of generally oblong cross-section (Fig. 2) and generally of gradually decreasing cross-sectional area toward the lower end 34 thereof (Fig. 1), is closed along the superposed margins 30 of the blank by a line of stitching 32, for instance. It is characteristic of the instant holster that its lower end 34 is, in contrast to conventional gun holsters, left open for a purpose to be described. Thus, it is the open lower end 34 of the holster 20 with which the latter is secured to the tank 14. In its mounted position, the open lower end 34 of the holster 20 is in registry with an opening 42 in the adjacent tank wall. In the present instance, the opening 42 is provided in the top wall 16 of the tank 14 near the side wall 18 thereof, and the holster 20 extends upwardly from the tank (Fig. 3), preferably in the rearwardly inclined fashion (Fig. 1) which saddle holsters normally assume on a horse's back. To this end, the lower open end 34 of the holster is made to be inclined to the axis x—x of the latter (Fig. 1), so that the mounted holster will be inclined rearwardly as shown in Fig. 1. Conveniently and expeditiously, the open end 34 of the holster 20 may be riveted, as at 40, to the top wall 16 and its smoothly rounded merger with the adjacent side wall 18 of the tank, so that the holster appears to be more or less continuous with the tank (Figs. 1 and 3). That part of the lower end 34 of the holster 20 which faces the top bar 10 of the bicycle frame need not necessarily be riveted or otherwise secured to the tank 14, since the rivets 40 in the opposite part of the holster end 34 are sufficient securely to hold the holster in place on the tank. The upper end 46 of the holster 20 is preferably shaped as shown in Fig. 1 or in a similar fashion, in order realistically to simulate the top end of a real gun holster of a certain type. The holster 20 is adapted for the reception of a toy gun $g$ and, by virtue of its registry with the tank opening 42, will guide the barrel or forward part $b$ of the toy gun through the opening 42 into the interior of the tank in the fashion indicated in dot and dash lines in Fig. 1. The toy gun $g$ is thus safely retained in the holster 20, although the latter is, by comparison with the size of the gun, too short to hold the entire gun. However, the described form of the instant holster 20 makes for extreme simplicity of the construction of the holster and greatly facilitates its attachment to the tank 14, as will be readily understood.

The other gun holster 22 may advantageously be attached to the tank 14 at the other side of the top bar 10 of the bicycle frame in the fashion shown in Figs. 2 and 3 so that the bicycle has the same appearance from both sides insofar as the mounted gun holsters are concerned. As for the holster 22, the tank wall 16 is provided with an opening 50 for the holster 22 to receive the forward end of a toy gun placed in the latter.

The gun holsters 20 and 22 in their present form on the bicycle tank 14 suggest to the rider of the bicycle, as well as to other observing youngsters, saddle holsters on a horse's back. Accordingly, the bicycle with the tank 14 and mounted gun holsters 20 and 22 readily suggests to youngsters to enlarge upon mere bicycle-riding by playing on their bicycles outdoor games involving gun play on horseback, such as playing cowboy, for instance. Aside from suggesting to a youngster the use of the bicycle in playing cowboy or similar outdoor games, the provision of the gun holsters 20 and 22 on the tank of the bicycle also goes far toward satisfying a natural desire of the youngster to bear some visual resemblance to the character which he or she portrays in playing.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent, is:

1. In a bicycle having a top bar, the combination of an elongated tank mounted in position longitudinally of and near said top bar and having an apertured wall to one side of the latter, and a simulated gun holster open at its upper and lower ends and being mounted relative to said tank in position in which its lower open end is in registry with said aperture in said tank wall so that the forward part of a toy gun placed in said holster projects through said aperture into the interior of the tank.

2. In a bicycle having a seat post mast and a front-wheel fork supporting head, the combination of an elongated tank mounted to extend longitudinally between said mast and head and having an apertured wall, and a simulated gun holster open at its upper and lower ends and being mounted relative to said tank in position in which its lower open end is in registry with said aperture in said tank wall so that the forward part of a toy gun placed in said holster projects through said aperture into the interior of the tank.

3. In a bicycle having a top bar, the combination of an elongated tank mounted in position longitudinally of and near said top bar and having an apertured wall to one side of the latter, and a simulated gun holster open at its upper and lower ends and being mounted relative to said tank in position in which its lower end engages and is closed by said apertured tank wall.

4. In a bicycle having a top bar, the combination of an elongated tank mounted in position longitudinally of and near said top bar and having an apertured wall to one side of the latter, and a simulated gun holster open at its upper and lower ends and being mounted with its lower end on said tank in registry with said aperture in said tank wall so that the forward part of a toy gun placed in said holster projects through said aperture into the interior of the tank.

5. In a bicycle having a top bar, the combination of an elongated tank mounted in position longitudinally of and near said top bar and having an apertured wall to one side of the latter, and a simulated gun holster open at its upper and lower ends and having a gradually decreasing cross-sectional area toward said lower end thereof, said holster being mounted relative to said tank in position in which its lower open end is in registry with said aperture in said tank wall so that the forward part of a toy gun placed in said holster projects through said aperture into the interior of the tank.

6. In a bicycle having a top bar, the combination of an elongated tank mounted in position longitudinally of and near said top bar and having an apertured wall to one side of the latter, and a simulated gun holster open at its upper and lower ends and having a gradually decreasing cross-sectional area toward said lower end thereof, said holster being mounted with its lower end on said tank in registry with said aperture in said tank wall so that the forward part of a toy gun placed in said holster projects through said aperture into the interior of the tank.

7. In a bicycle having a top bar, the combination of an elongated tank mounted in position near said top bar with its longitudinal axis substantially parallel to the latter, and having a top wall provided with apertures near the opposite sides, respectively, of said tank, and simulated gun holsters open at their upper and lower ends and being mounted relative to said tank in positions in which their lower open ends are in registry with said apertures, respectively, in said top wall so that the forward parts of toy guns placed in said holsters, respectively, project through the associated apertures into the interior of the tank.

8. In a bicycle having a top bar, the combination of an elongated tank mounted in position directly beneath said top bar with its longitudinal axis substantially parallel to the latter, and having a top wall provided with apertures on opposite sides, respectively of said tank, and simulated gun holsters open at their upper and lower ends and being mounted relative to said tank in positions in which their lower open ends are in registry with said apertures, respectively, in said top wall so that the forward parts of toy guns placed in said holsters, respectively, project through the associated apertures into the interior of the tank.

9. In a bicycle having a seat post mast and a front-wheel fork supporting head, the combination of an elongated tank mounted to extend longitudinally between said mast and head, and having opposite side walls and a top wall provided with an aperture near one of said side walls and merging at its opposite sides in smoothly curved fashion with said side walls, respectively, and a simulated gun holster open at its upper and lower ends and being mounted with its lower end on said tank in position thereon in which its lower end surrounds said aperture and extends in part over the curved merger of said top wall with said one side wall, so that the forward part of a toy gun placed in said holster projects through said aperture into the interior of the tank and said holster appears to be continuous with said one side wall of the tank.

10. In a bicycle having a seat post mast and a front-wheel supporting head, the combination of an elongated tank mounted to extend longitudinally between said mast and head, and having opposite side walls and a top wall provided with laterally aligned apertures near said side walls, respectively, and merging at its opposite sides in smoothly curved fashion with said side walls, respectively, and simulated gun holsters open at their upper and lower ends and being mounted with their lower ends on said tank in positions thereon in which their lower ends surround said apertures, respectively, and extend in part over the curved mergers of said top wall with the adjacent side walls, respectively, of the tank so that the forward ends of toy guns placed in said holsters, respectively, project through the associated apertures in the tank into the interior of the latter and said holsters appear to be continuous with the adjacent side walls, respectively, of the tank.

CHARLES H. PARTON.

REFERENCES CITED

The following references are of record in the file of this patent:

UNITED STATES PATENTS

| Number | Name | Date |
|---|---|---|
| D. 120,395 | Morgan | May 7, 1940 |
| 410,681 | Watkins | Sept. 10, 1889 |
| 567,162 | Peirce | Sept. 8, 1896 |
| 1,320,751 | Freyer | Nov. 4, 1919 |
| 2,531,170 | Tackett | Nov. 21, 1950 |